(No Model.) 3 Sheets—Sheet 2.
A. GATEAU.
LIQUID CARBONIC ACID GAS MOTOR.
No. 265,493. Patented Oct. 3, 1882.
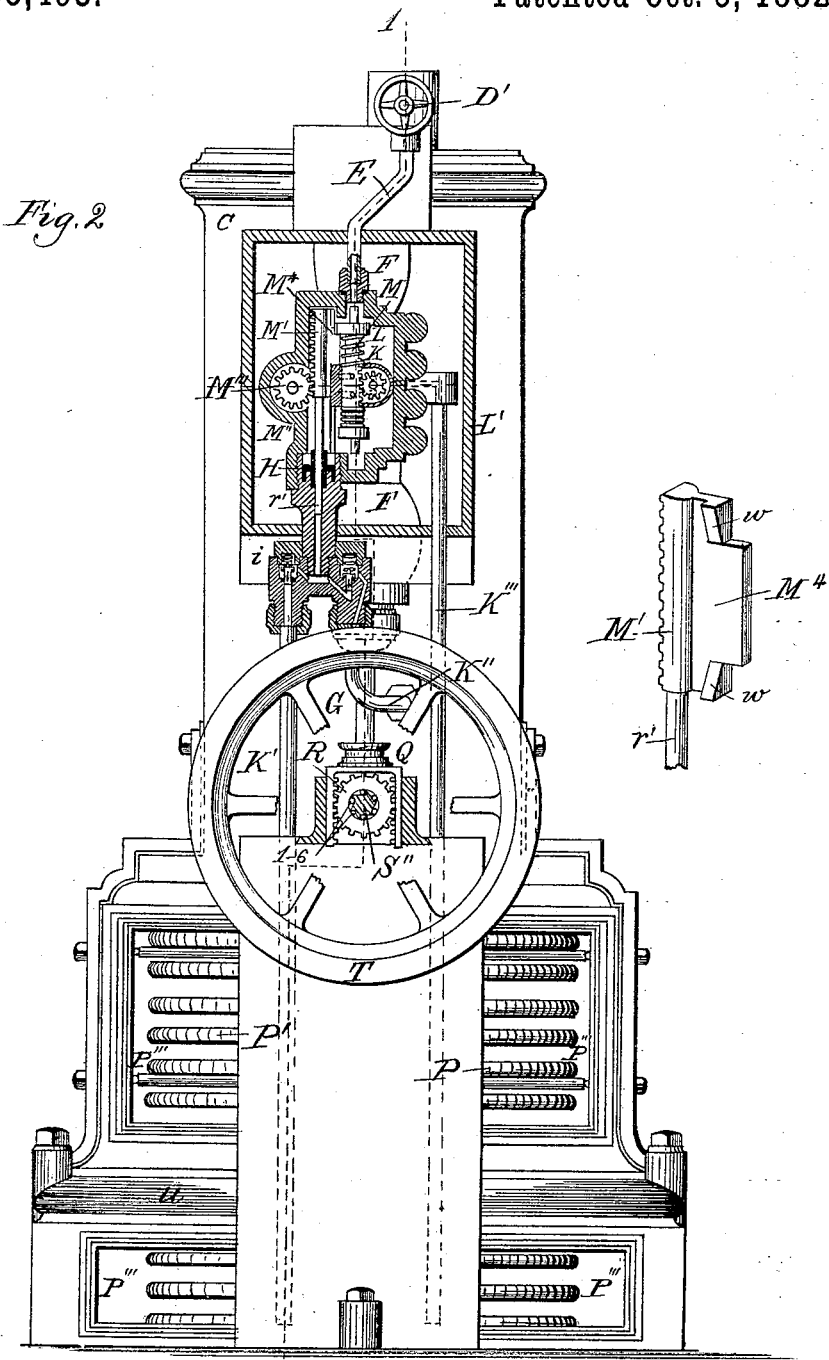
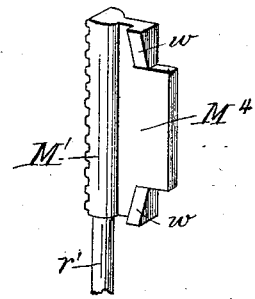
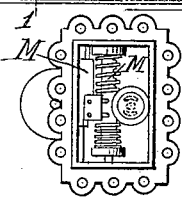
Witnesses:
L. M. Freeman.
Chas. F. Jones.
Inventor:
Antoine Gateau.
L. B. Coupland & Co.
Attorneys.

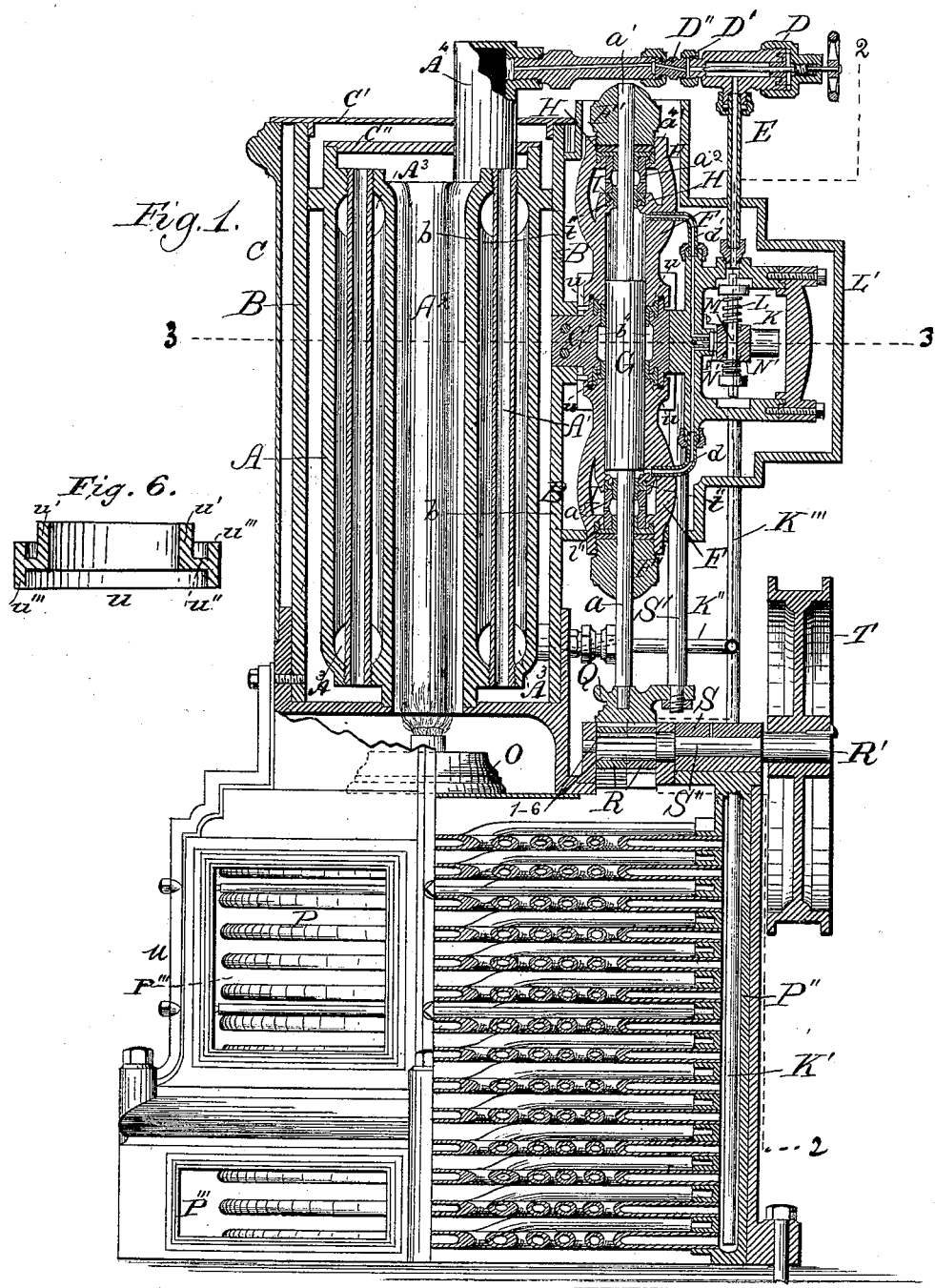

(No Model.) 3 Sheets—Sheet 3.
A. GATEAU.
LIQUID CARBONIC ACID GAS MOTOR.
No. 265,493. Patented Oct. 3, 1882.
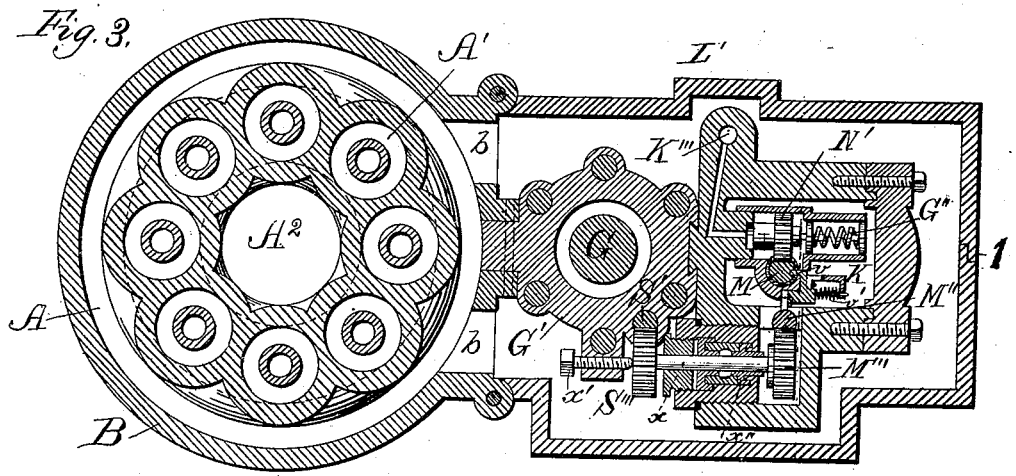
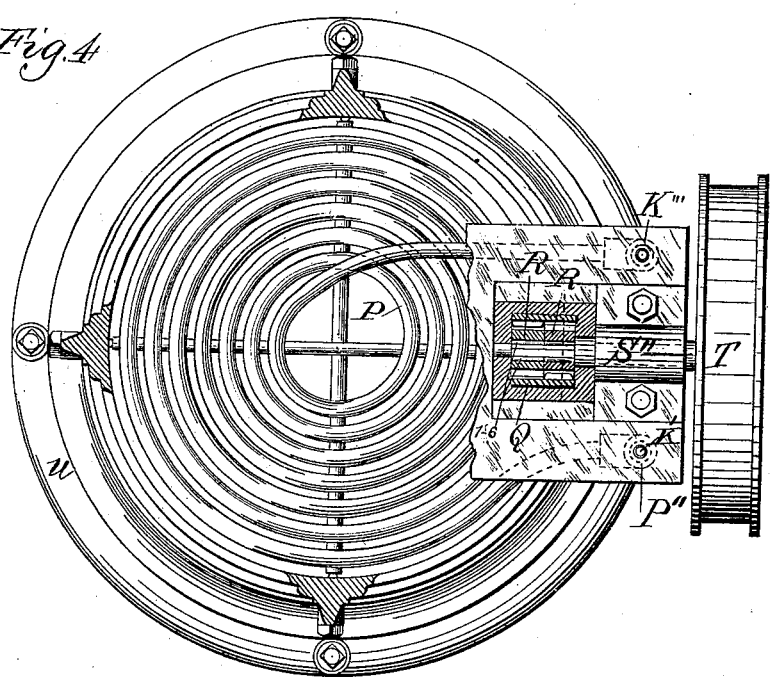
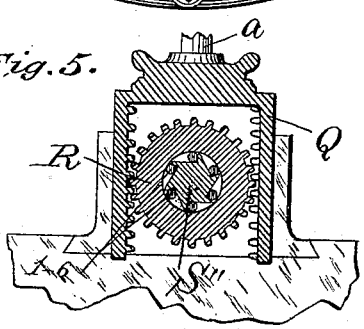
Witnesses:
L. M. Freeman
Chas. F. Jones
Inventor:
Antoine Gateau
L. B. Coupland & Co.
Attorneys.

UNITED STATES PATENT OFFICE.

ANTOINE GATEAU, OF CHICAGO, ILLINOIS.

LIQUID CARBONIC ACID GAS MOTOR.

SPECIFICATION forming part of Letters Patent No. 265,493, dated October 3, 1882.

Application filed July 8, 1882. (No model.)

*To all whom it may concern:*

Be it known that I, ANTOINE GATEAU, of Chicago, in the county of Cook and State of Illinois, have invented certain new and useful Improvements in a Liquid Carbonic Acid Gas Motor; and I do hereby declare the following to be a full, clear, and exact description of the invention, that will enable others skilled in the art to which it appertains to understand and make use of the same, reference being had to the accompanying drawings, and to letters of reference marked thereon, forming a part of this specification.

The invention relates to that class of gas motors or engines in which the motive power or agent is generated in the apparatus from gas in a liquid state.

The object is to produce a very powerful engine in a compact form, occupying but a small space, and capable of being used for many different purposes.

The invention consists in the construction and arrangement of certain parts, as will be more fully described hereinafter, and specifically pointed out in the claims, reference being had to the accompanying drawings, in which—

Figure 1 is a vertical cross-section of the motor, partly in elevation. Fig. 2 is a front elevation of the same, partly in section. Fig. 3 is a horizontal section on line 3 3 of Fig. 1. Fig. 4 is a top or plan view of the condenser and a partial section on line 4 4 of Fig. 2. Fig. 5 is an enlarged sectional view of the yoke. Fig. 6 is an enlarged section of a packing-ring.

In the drawings, A represents the generator, of cylindrical form, which is composed of a series of tubes annularly arranged and integral with each other, and forming a central chamber, $A^2$. In these tubes are placed the series of small or internal tubes, $A'$, and form an annular space between the inner and outer tubes for the generation and circulation of the gas. The outer tubes are connected at their upper and lower ends to an annular pipe or crown, $A^3$. This generator is inclosed by the cylinder B, which in turn is surrounded by an outer non-conducting casing, C, these parts being provided with the heads $C'$ and $C''$, respectively. The cylinder B, being of strong material, will prevent danger from an explosion, and, as the head $C'$ is made of light material, the generator will fly upward in case of an accident. The upper annular pipe or connection, $A^3$, communicates with a dome, $A^4$, and, if the size will admit, the generator with the connections $A^3$ and dome $A^4$ are cast in one piece to avoid joints, &c. The heat of a lamp or products of combustion ascend through the central flue, $A^2$, then descend through the small tubes $A'$, and again ascend on the outside of the annular tubes, pass into a casing surrounding the cylinder and gas-chamber, and finally escape through an opening, $a^4$, or a chimney into the atmosphere.

The engine-cylinder is composed of three main parts properly bolted together, and contains the piston G. The central part, $G'$, is bolted to the body B, inclosing the generator. In the center of the part $G'$ is formed a space, $b^4$, for containing a suitable packing-liquid, and at each end is arranged a packing, $u$. (Shown in Fig. 6.) It consists of an annular ring, $u'$, having a radial part, $u''$, which is provided with lateral flanges $u'''$, and forming a T with the part $u''$. The flanges $u'''$ fit into recesses formed in the part $G'$, and are held in place by them and the adjacent end of the parts F of the cylinder. The packing-rings face each other, with the annular rings $u'$, so that these parts clamp the piston in its reciprocations, and thus form a perfectly-tight joint with very little friction, and prevent any leakage of gas. The end parts, F F, of the cylinder are bolted to the central part, $G'$, suitable packing being inserted to secure tight joints, as described. The ends of the cylinders are closed by the screw-heads $F' F'$. In each part F F is formed a chamber, I I, filled with a suitable liquid for packing—such as glycerine, rubber, &c.—to prevent leakage or escape of the gases around the piston-rods.

The piston G is provided with the rods $a\ a'$, of which the rod $a$ extends downward and is connected to the vertically-moving yoke Q. This yoke is provided with suitable cogs or teeth on diagonally-opposite sides—*i. e.*, the rack on one side is opposite the space on the other side of the yoke, and vice versa. These teeth engage alternately with the two gear-wheels R on the main shaft S″, journaled in bearings S. In the inner parts of each of the wheels R are arranged a set of rollers, 1–6, each roller being placed in a groove or recess of ratchet or saw-tooth form. When the yoke Q moves downward the front wheel R turns toward the left side, and the rollers will engage or wedge with the shaft S″ and the inner part of the front wheel R. This wheel and the shaft will then revolve in the same direction. The rear wheel R, with its rollers 1–6, turns toward the right and allows the shaft S″ to revolve loosely. When the yoke Q ascends the rear wheel R will revolve to the left and engage the rollers 1–6 with the shaft S″ and against the inner side of the gear-wheel, when this wheel and shaft will move it in the same direction as before. The front wheel R now turns toward the right, and the rollers 1–6, being disengaged, allow the shaft S″ to revolve freely in it. By this means a reciprocating motion is converted into a rotary motion, which is thus imparted to the shaft S″, with its pulley T, to the machine to be operated. The upper rod, $a'$, serves to equalize the amount of piston-surface, so that the motive agent will have the same area to work against at both ends of the piston, and thus prevent an irregular action by excess of pressure on one end of the piston. The piston-rods move through double packed joints H H, the packing-rings being of the form shown—that is, a packing-ring fitting closely to the piston-rod and having a laterally-projecting flange, which in turn has a part extending at right angles to the lateral flange and fitting into a corresponding recess in the ends of the cylinder. The packing-rings $l''$, forming the double joint, are separated by the ring $a^2$, which is perforated, so as to allow the liquid from the chambers I I to fill the annular space around the piston-rods between the packing-rings, as shown in Fig. 1. Another packing-piece, $t''$, is formed at the inner ends of the chambers I. This construction forms a positively tight joint. Between the screw-heads F′ and the outer packing-rings is placed a washer, which serves to prevent an uneven pressure when the parts are adjusted.

A casing, L′, shaped to conform to the general contour of the engine-cylinder, gas chamber or chest, and other parts of the engine, is arranged in such manner as to leave a space between them. This casing is hinged to the body B, as shown in Fig. 3, and is connected together at the front side by a lap-joint, so that the casing can be opened to gain access to the interior for examination or repair.

A rack, M, (shown in Figs. 1 and 2,) is provided with a longitudinally-toothed surface to engage with corresponding teeth on a circular gas-valve, N′, which receives a quarter-revolution, and is provided with suitable ports or passages, which register with the ports $d\ d'$, so as to admit or exhaust the gas to and from each end of the cylinder, to which it is admitted by the main valve N′. The exhaust passes through the pipe K‴, which communicates with the condenser P. Motion is imparted to the valve N′ by means of the shoulders formed by the projection $M^4$ on the rack M′ striking against suitable tappets or pistons upon the valve-stem extending from the rack, thus controlling the admission of the gas or motive agent alternately to and from the opposite ends of the cylinder. The rack is held at the upper and lower stroke by pins or locks $v$, which engage alternately with holes or notches in the valve-stem. They are forced into said holes by springs $v'$ on the back of the rack. They are alternately raised out of the holes by the tappets $w$ on the rack as they come in contact with them.

A pump arranged partly within the casing L′, and with its valves below the same, serves to keep up a circulation of the liquid gas between the condenser and generator. The pump-rod $r'$ is provided with a rack, M′, with which a pinion, M‴, engages and imparts motion to it.

The condenser P consists of a casing in which are contained a series of flat coils of pipe, arranged one above the other, so as to more minutely divide the gas, and all the coils have a common connection with the tubular part P″, with which the exhaust-pipe K‴ connects, while the suction-pipe K′ extends to near the bottom and connects with the pump. One end of each coil has communication with the exhaust and the other with the part leading to the pump, as seen in Fig. 4. By arranging the coils in this manner in the form of spirals a large amount of condensing-surface is obtained, and the gas is condensed instantly, which would not be the case if the coils were arranged in the ordinary worm shape. Open panels P‴ are arranged in the sides of the casing, so that a free circulation of air is obtained among the coils, and by arranging the lamp immediately above them a greater current of air is created, which is also heated before coming in contact with the flame, and it then ascends through the passage $A^2$.

The lower end of a rod, S′, is connected to a projection or lug on the yoke Q, as seen in Fig. 1, the upper end thereof being formed into a rack, which engages with a gear-wheel, S‴, on a small horizontal shaft, $x$. On its opposite end is secured a gear-wheel, M‴, that meshes with the rack-teeth on the upper end of the pump-rod, by which means motion is imparted to the pump. On the end of this shaft is arranged an adjusting-screw, $x'$, to prevent contact of the wheel M‴ with the end of the packing in the stuffing-box $x''$.

Preparatory to rotating the motor the generator is charged with liquid carbonic acid or its equivalent by any of the well-known means. The pressure of the gas generated therefrom is about nine hundred pounds, subject to the variations due to the temperature of the atmosphere. The engine is then started and works under the pressure named until the pressures in the condenser and generator are equal. Heat is then applied to the generator, and the pressure therein is increased to from fifteen to eighteen hundred pounds. The engine then continues to work under the difference of pressure between the condenser and the generator, the pressure in the former never reaching that in the latter. The throttle-valve D admits the gas to the chamber or chest K on the cylinder. The conducting or inlet pipe between the valve and generator is provided with the union-joints D' D'', the opening or passage through which is not in a direct line, excepting when the pipe is turned in one direction to register with it, and when turned in the opposite direction the passage is closed, and the valve can then be removed for repairs, &c. The gaseous liquid is drawn from the condenser through the pump valves and passages (shown in Fig. 2) and conveyed through the pipe K'' to the generator, where it is reheated and used over and over again, a continuous supply being thus obtained. This pipe is provided with similar union-joints as the gas-conducting pipe. A lamp, O, is inserted through a suitable door in the casing and placed under the passage $A^2$. It serves for the purpose of heating the air at the lower side of the generator, and also for creating a current through the coils in the condenser. The hot air ascends through passage $A^2$, then it descends through the tubes A', and thence ascends again in the annular space between the generating-tubes and the inclosing-body B, and from here the hot air passes into the space formed by the casing L', inclosing the cylinder, gas-chest, and other parts, and prevents the condensation of the gas therein, as the generator and the adjoining parts are thus kept at a uniform temperature. By this means none of the expansive force of the gas is lost in the cylinder and adjacent parts. By the heat being applied three times to the gas in the generator it becomes more thoroughly heated and expanded, reaches the cylinder in a more rarefied and dry state, and is more economical. The liquid for the packing is introduced into the chambers I I and the central space of the cylinder G' by means of union-joints similar to those employed in the gas-inlet pipe.

Having thus described my invention, what I claim, and desire to secure by Letters Patent, is—

1. In a gas-motor, the generator consisting of a shell, B, containing a series of integrally-formed tubes, A, in which smaller tubes, A', are secured, forming annular independent spaces for generating the gas, communicating with chambers $A^3$, in combination with a central passage, $A^2$, by which the tubes, and inclosing shell, a double return-passage is formed for the hot air, substantially as set forth.

2. The generator herein described, consisting of a series of integral tubes, A, connected at their upper and lower ends to an annular pipe, $A^3$, the upper one communicating with a dome, $A^4$, and the central passage, $A^2$, in combination with the tubes A', the heads C' C'', and an inclosing-casing, B, all substantially as specified.

3. In a motor, a cylinder consisting of a central part, G', attached to a casing, B, and having the ends F F provided with liquid-chambers I I, secured to said central part, substantially as specified.

4. The central cylinder-section, G', having a space for a packing-fluid, and the packing-rings $u$, arranged substantially as shown, and for the purpose set forth.

5. The combination of the cylinder ends F F with the piston-rods $a$ $a'$, the packing-rings $t''$, the intermediate perforated rings, $a^2$, the chambers I I, and the screw-heads F', all substantially as herein set forth.

6. In a motor, the rack-bar M' and gear-wheel M''', in combination with the part M'', the pump-rod $r'$, and rack-bar M, having stop-pins and springs L, and the main valve, substantially as and for the purpose specified.

7. The combination of the rack-bar M' and wheel M''' with the projection $M^4$, tappets $w$, lock-pins $v$ and springs $v'$, and the main valve, substantially as set forth.

8. The combination of the rack-bar M', gear-wheel M''', and shaft $x$ with the gear-wheel S''', rod S', and yoke Q, substantially as shown and described.

9. In combination with the piston G and the cylinder part G' and end sections, F F, the packing-rings $u$, consisting of annular rings $u'$, having part $u''$, with lateral flanges $u'''$, all constructed substantially as specified.

10. In a motor, the combination, with the piston-rod $a$, of the yoke Q, having gear-faces on diagonally-opposite sides, between which the gear-wheels R revolve, and the main shaft S'', substantially as described.

11. The combination, with the piston-rod $a$, of the yoke Q, having gear-faces on diagonally-opposite sides, and the gear-wheels R, provided with rollers 1–6, arranged in the ratchet-notches of the shaft S'', to alternately revolve the wheels and the shaft continuously, substantially as specified.

12. In a motor, the condenser herein described, consisting of a casing containing a series of horizontal separate coils arranged above each other, and having a common vertical connection with the exhaust-passage from the motor-cylinder, substantially as and for the purpose specified.

13. In a motor, the condenser herein described, consisting of a casing provided with open panels and a series of coils arranged above each other in horizontal planes, and having a common connection with the exhaust-passage and the suction-pipe of the pump, as specified.

14. In the motor herein described, the combination of the condenser, having a series of coils arranged above each other in horizontal planes, and open panels P''', with the lamp O and central passage, A², of the generator, substantially as and for the purpose herein set forth.

15. In a gas-motor, the gas-inlet passage controlled by two union-joints, D' D'', and an inclined opening or passage, in combination with the throttle-valve D, substantially as specified.

16. The method of operating a motor by means of gas generated from carbonic acid triple-heated, then passing said gas to a working-cylinder, thence to a condenser, and finally returning it to the generator, substantially as and for the purpose set forth.

17. In a motor, a pump arranged to extend into the casing or gas-chamber to prevent leakage of gas toward the outside, substantially as specified.

18. In combination with the generator, working-cylinder, gas-chamber, and working parts of a gas-motor, the casing L', entirely surrounding said parts and forming a space for the products of combustion, and said casing provided with a hinged front section having a lap-joint for gaining access to the parts, substantially as shown and specified.

ANTOINE GATEAU.

Witnesses:
L. M. FREEMAN,
S. STARK.